L. B. COMER.
MILK STERILIZING APPARATUS.
APPLICATION FILED MAR. 18, 1922.
1,432,671.
Patented Oct. 17, 1922.
2 SHEETS—SHEET 1.
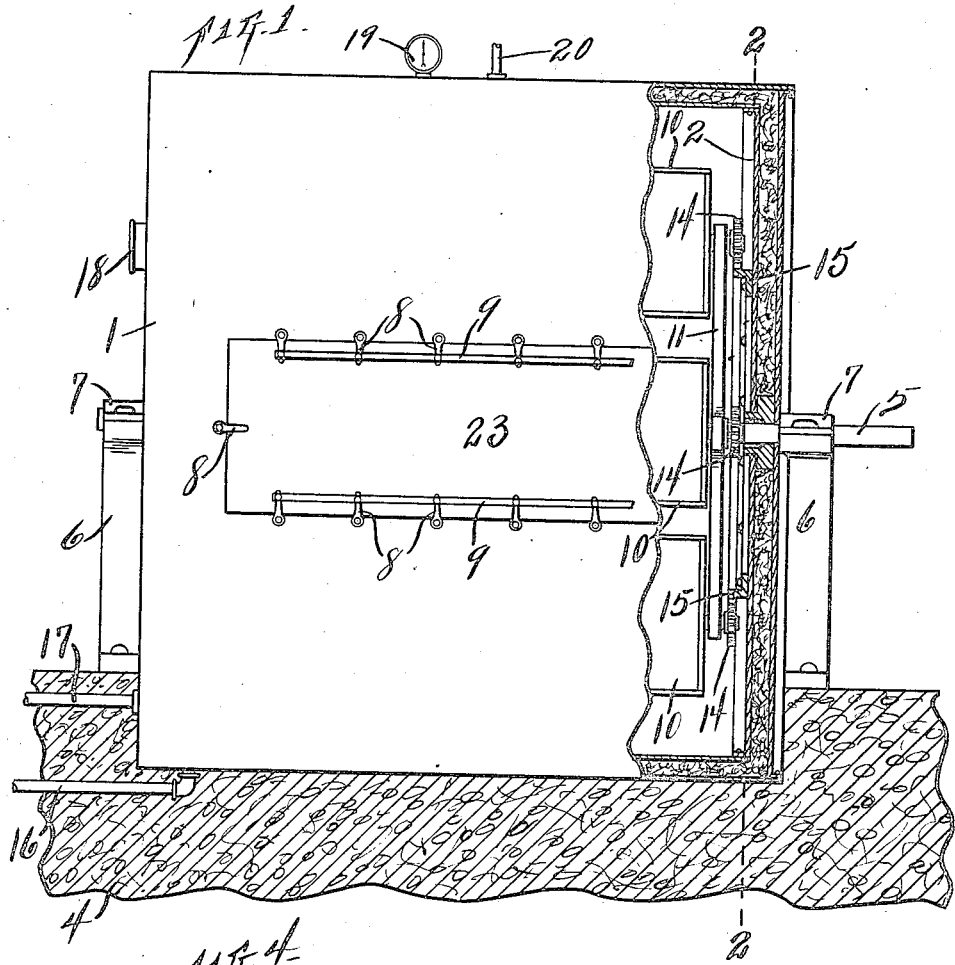
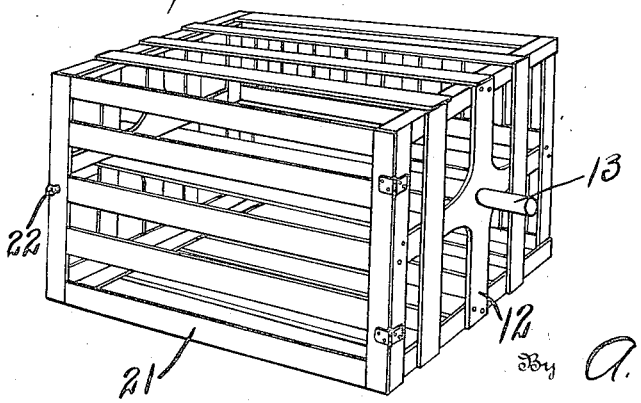
Inventor
LUTHER B COMER.
By A. L. Jackson
Attorney

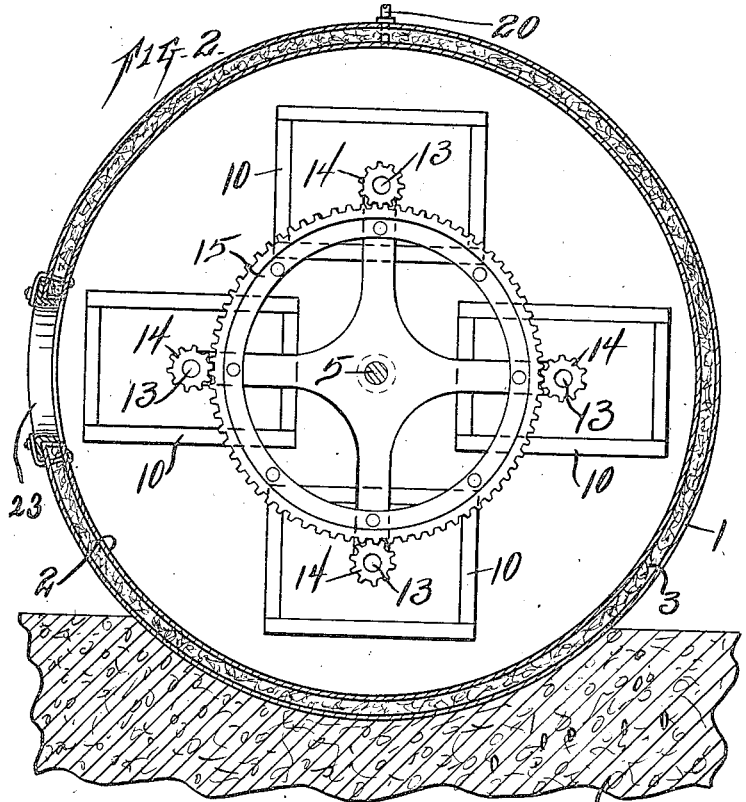
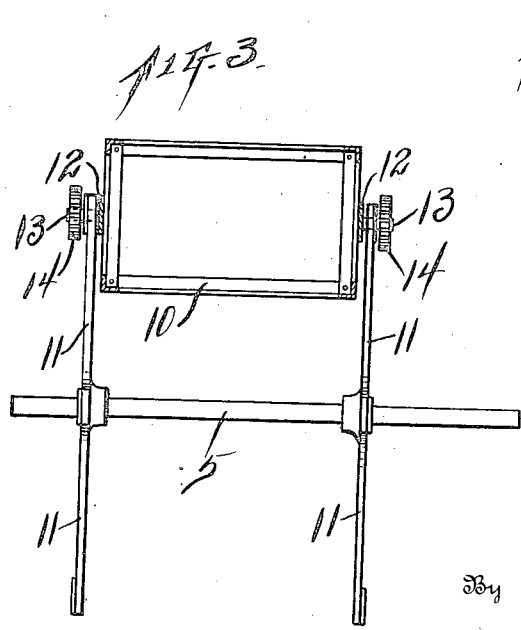
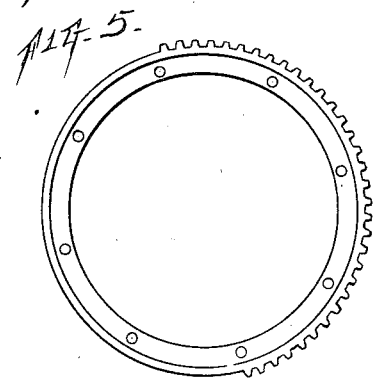

Patented Oct. 17, 1922.

1,432,671

UNITED STATES PATENT OFFICE.

LUTHER B. COMER, OF FORT WORTH, TEXAS.

MILK-STERILIZING APPARATUS.

Application filed March 18, 1922. Serial No. 544,797.

*To all whom it may concern:*

Be it known that I, LUTHER B. COMER, a citizen of the United States, residing at Fort Worth, in the county of Tarrant and State of Texas, have invented certain new and useful Improvements in Milk-Sterilizing Apparatus, of which the following is a specification.

My invention relates to sterilizing milk, and more particularly to an improved apparatus for uniformly subjecting the milk under treatment to constant predetermined heat.

In sterilizing the milk it is preferable that all portions thereof should be exposed to the heating medium and that the predetermined degree of heat should be maintained during the sterilizing process in order that all pathogenic bacteria may be eliminated and destroyed without impairing the essential food value of the milk.

One of the objects of my invention is to provide a sterilizing apparatus in which the milk will be constantly and systematically, but not rapidly, agitated, so that all portions of the milk will be uniformly exposed to the heat and to means for determining the degree of heat in the treating receptacle and means to regulate the temperature to the required degree of heat.

Another object of my invention is to provide a milk sterilizing apparatus which will be approximately insulated from the surrounding atmosphere so that the desired critical temperature may be maintained regardless of the atmospheric conditions.

A further object of my invention is to provide an apparatus for sterilizing milk, meats, fruits, and vegetables, and also for cooling these products at required times.

Other objects and advantages will be fully explained in the following description and the invention will be more particularly pointed out in the claims.

Reference is had to the accompanying drawings which form a part of this application.

Fig. 1 is a side elevation of the receptacle, partly in section, in which the sterilizing operation is carried on.

Fig. 2 is a vertical section substantially along the line 2—2 of Fig. 1.

Fig. 3 is a detail view of the interior operating mechanism.

Fig. 4 is a perspective view of a double deck cradle.

Fig. 5 is a detail view of the main driving gears, showing a variation from the driving gear shown in Fig. 2.

Similar characters of reference are used to indicate the same parts throughout the several views.

The apparatus includes a receptacle 1 which is preferably composed of an outer shell 1 and an interior shell 2 with insulation 3 interposed between the inner and outer shells. The receptacle may be mounted partly within a bed of concrete 4. A main driving shaft 5 is journalled in upright bearing supports 6 which are provided with bearing boxes 7. Spiders 11 are made rigid with the shaft 5 and cradles 10, which are provided with stud shafts 13 and spiders 12, are journalled in the arms of spiders 11. Pinions 14 are rigid with the stud shafts 13 and mesh with cog wheels 15 which are attached to the casing, or inner shell 2, and rigid therewith. The receptacle is provided with a door 23, and this door is held in place by keepers 8. The keepers on the sides of the door may all be pivotally connected to rods 9 so that all of the keepers can be turned at a single operation on each side of the door. The shaft 5 may be driven by any suitable power and this will revolve the spiders 11 and so bring the pinions 14 constantly in mesh with the cog wheels 15 and so revolve the cradles 10. The movement of the gearing is preferably at a low speed. The cradles will thus be constantly revolved and the speed should be uniform so that the agitation will not be violent. It may be desirable in some cases to rotate the cradles during one-half of the revolution as shown in Fig. 5.

The receptacle is provided with a drain pipe 16 and with a pipe 17 for the introduction of cold water or refrigerated air. The receptacle is also provided with a pipe 20 for introducing the heating element which might be superheated steam or heated air.

The receptacle is provided with a thermometer 18 for recording the temperature within the receptacle and a gauge 19 is provided and communicates with the interior of the receptacle to indicate the pressure therein.

The cradles 10 may be constructed for containing a single crate. The milk is contained in bottles of the ordinary type and sealed and the bottles are carried in a crate. The crate may be inserted in the cradle 10 and the cradle 10 then closed by means of the door 21 which may be hinged to the cradle and held closed by a keeper 22. If the milk is put up in quart bottles, one crate only can be placed in the cradle 10. If the milk is put in pint bottles, a double deck crate, such as shown in Fig. 4, may be used so that two crates may be put in one cradle.

The gearing wheels 14 and 15 should be so coordinated that the door of each cradle may be stopped at the door 23 of the receptacle. There may be any number of cradles 10, the number being determined by the size of the receptacle.

It will be seen that the milk can be placed in the sterilizing receptacle and constantly agitated so that the milk will be uniformly subjected to the heating medium throughout the receptacle and no milk is left standing while being sterilized.

The same regularity of agitation may be carried on during a cooling period when the milk is subjected to a cooling medium introduced through the pipe 17.

The apparatus shown is equally adapted for sterilizing purposes for milk, meat, fruits and vegetables. The apparatus is also adapted for a moderate cooling operation as is required for the milk and other articles. The apparatus may be used also for refrigerating purposes.

What I claim is:—

1. In a sterilizing apparatus, the combination with a casing, of means for heating the interior of the casing, cradles within said casing for containing the milk or other articles to be treated, means for revolubly supporting the cradle, and gearing stationary on said casing and gearing rigid with each cradle for causing a complete revolution of said cradles about the interior of said casing and simultaneously for constantly and uniformly rotating the cradles during their revolution.

2. In a sterilizing apparatus, the combination with a casing, of means for heating the interior of the casing, cradles within said casing for containing the material to be treated, means for revolubly supporting the said cradles, gear wheels rigid with the interior portions of said casing and gear wheels rigid with said cradles and operatively connected with the gear wheels on said casing for moving said cradles complete revolutions about the interior of said casing for simultaneously and constantly rotating them throughout the travel thereof, and means for determining the degree of heat within said casing.

3. In a sterilizing apparatus, the combination with a casing, of means for heating the interior of the casing, cradles within said casing for containing the material to be treated, a shaft provided with spiders for revolubly supporting said cradles, cog wheels rigid with said casing and pinions journalled in said spiders and meshing with said cog wheels, for constantly rotating said cradles throughout their travel.

4. In a sterilizing apparatus, the combination with a stationary casing of insulating means surrounding said casing, a removable door provided with insulating material and forming part of one side of said casing, a shaft extending longitudinally through and concentric with said casing, spiders with aligned pairs of radial arms fixed to said shaft, cradles pivotally supported between the arms in the aligned pairs, cog wheels attached to the interior of said casing at each end and concentric with said casing, pinions operatively connected to said cradles, one at each end of each cradle, and meshing with said cog wheels, means for heating the said receptacle throughout the dimensions thereof, and means for determining the temperature throughout said casing while said cradles are being rotated.

5. In a sterilizing apparatus, the combination with a casing, a shaft projected longitudinally through said casing, cradles within said casing for containing the material to be treated, means rigid with said shaft for positioning said cradles concentrically relative to said shaft, means co-operating with said shaft for moving said cradles in complete revolutions about said shaft within said casing and for simultaneously causing planetary motion of each cradle relative to said shaft for causing uniform and constant treatment of materials in said cradles, means for heating and cooling the interior of the casing to be selectively used, and means for draining said casing.

In testimony whereof, I set my hand, this 7th day of March 1922.

LUTHER B. COMER.